No. 745,333.

Patented December 1, 1903.

UNITED STATES PATENT OFFICE.

WILLIAM PHILLIPS DUNBAR, OF HAMBURG, GERMANY, ASSIGNOR TO THE FIRM OF ICHTHYOL-GESELLSCHAFT CORDES, HERMANNI & CO., OF HAMBURG, GERMANY.

SERUM AND PROCESS OF PREPARING SAME.

SPECIFICATION forming part of Letters Patent No. 745,333, dated December 1, 1903.

Application filed October 20, 1902. Serial No. 128,057. (No specimens.)

*To all whom it may concern:*

Be it known that I, WILLIAM PHILLIPS DUNBAR, doctor of philosophy, a citizen of the German Empire, and a resident of the city of Hamburg, in the German Empire, (whose post-office address is Jungiusstrasse,) have invented a new and useful Serum and the Process of Preparing the Same, of which the following is a specification.

This invention relates to the preparation of serums and is based upon the fact that the pollen grains of certain plants have the property of inducing symptoms of illness in many persons—so, for instance, it has been ascertained by Elliotsen (*London Med. Gazette* 1831, page 411,) and Blackley (*Experimental Researches on the Causes and Nature of Catarrhus æstivus*, London, 1873, Ref.; *American Journal of Medical Science* 67, page 181) that the so-called "hay-fever or summer catarrh," which was first described by John Bostock (*Medicochirurg. Transactions*, Vol. X, part I, page 161) is caused by pollen grains.

My invention now has for its object to remove the symptoms of illness caused by the pollen grains of plants, and I attain this object by a serum which I produce from the blood of animals in which pollen grains or constituents of the same have been incorporated.

The invention therefore consists in incorporating pollen grains or constituents of the same in animals, and thereby causing the production of substances in the blood of these animals, which are adapted to remove or nullify the prejudicial action of the pollen grains. Thus, for example, I have succeeded, by means of the pollen grains of grasses (*gramineæ*) or constituents thereof in inducing in certain persons the symptoms of hay-fever and, moreover, in undoubtedly proving that the hay-fever is caused by a poison (toxin) which dissolves in the lachrymal secretions, the nasal mucus, the saliva, blood-serum, &c. If, however, animals are inoculated with these microscopic pollen grains or their constituents, a serum may be obtained from the blood of these animals by which when applied to the mucous membrane or subcutaneously injected the symptoms of the hay-fever in persons struck therewith are shortly removed or nullified. As experiments have proved, the serum of the blood of animals inoculated with the pollen grains of grasses or their constituents contains an antitoxin which prevents or nullifies the injurious action of the said toxin.

In order to make my invention clearly understood by any one skilled in the art, I will proceed to explain the same by way of a specific example, giving a preferred method of carrying out my invention, but without limiting the scope of the same to the exact mode and particulars disclosed.

Pollen grains of *gramineæ*—for example, of rye—are triturated and extracted by a saline solution of 2.5 per cent. chlorid of sodium at 37° centigrade for about ten to fifteen hours. The extract thus obtained is diluted with sterilized water until the contents of chlorid of sodium in the solution is reduced to one per cent. Of this diluted solution about twenty-five to fifty cubic centimeters are then subcutaneously or otherwise injected into a horse, which after the injection usually shows symptoms of illness, as fever, loss of weight and appetite, &c. These injections are repeated at intervals of about two to ten days as soon as the horse has quite recovered. It will then be observed that after a certain number of injections—say ten to thirty or more, according to the individual reaction of different horses—the serum has attained an adequate degree of efficiency. This is the case when a mixture of the serum with equal parts of a standard solution of the toxin causes no irritation in the eyes of hay-fever patients.

The blood to be drawn from the animal for the preparation of the antitoxin serum is to be treated in the usual manner—that is to say, the serum may be obtained from the blood by separating therefrom the clot in a suitable apparatus by centrifugal force. The serum thus obtained may be applied, as aforesaid, to diseased persons either in the liquid state or as a powder, in which latter case the serum needs to be evaporated to dryness.

Having thus described my said invention, what I claim as new therein, and desire to secure by Letters Patent, is—

1. The process of preparing serums which consists in incorporating pollen grains of plants in the blood of animals, drawing a quantity of blood from the same and separating the serum from the clotted blood, substantially as and for the purpose set forth.

2. The process of preparing serums, which consists in incorporating the constituents of pollen grains of plants that induce illness in the blood of animals, drawing a certain quantity of blood from the same and separating the serum from the clotted blood, substantially as and for the purpose set forth.

3. A hay-fever antitoxin, consisting of serum of the blood of animals treated with pollen grains of plants and having the characteristic of immunizing test animals against infection with hay-fever, and curing them when artificially infected with hay-fever, said serum containing a counterpoison for the poison of hay-fever, substantially as set forth.

4. A hay-fever antitoxin, consisting of serum of the blood of animals treated with pollen grains of *gramineæ* and having the characteristic of immunizing test animals against infection with hay-fever, and curing them when artificially infected with hay-fever, said serum containing a counterpoison for the poison of hay-fever, substantially as set forth.

WILLIAM PHILLIPS DUNBAR.

Witnesses:
MAX KAEMPFF,
E. H. L. MUMMENHOFF.